United States Patent
Montresor et al.

(10) Patent No.: US 9,366,456 B2
(45) Date of Patent: Jun. 14, 2016

(54) CONCENTRATED SOLAR TOWER ASSEMBLY AND METHOD

(71) Applicant: ALSTOM Technology Ltd, Baden (CH)

(72) Inventors: Paolo Montresor, Neuenhof (CH); Michael Sack, Wettingen (CH); Markus Friess, Heilbronn (DE)

(73) Assignee: ALSTOM Technology Ltd., Baden (CH)

( * ) Notice: Subject to any disclaimer, the term of this patent is extended or adjusted under 35 U.S.C. 154(b) by 36 days.

(21) Appl. No.: 14/031,499

(22) Filed: Sep. 19, 2013

(65) Prior Publication Data

US 2014/0083097 A1    Mar. 27, 2014

(30) Foreign Application Priority Data

Sep. 19, 2012   (EP) ..................... 12185059

(51) Int. Cl.
*E04H 12/34* (2006.01)
*F24J 2/02* (2006.01)

(52) U.S. Cl.
CPC . *F24J 2/02* (2013.01); *E04H 12/34* (2013.01); *E04H 12/342* (2013.01); *E04H 12/344* (2013.01); *Y10T 29/49355* (2015.01)

(58) Field of Classification Search
CPC ..... E04H 12/34; E04H 12/341; E04H 12/342; E04H 12/344
See application file for complete search history.

(56) References Cited

U.S. PATENT DOCUMENTS

| 2,676,388 | A | * | 4/1954 | Faure | B66C 23/283 212/176 |
|---|---|---|---|---|---|
| 3,672,115 | A | * | 6/1972 | Abe | E04H 12/34 212/176 |
| 3,673,754 | A | * | 7/1972 | Murashige | E04H 12/28 254/105 |
| 4,134,237 | A | | 1/1979 | Armstrong | |
| 4,268,319 | A | * | 5/1981 | Muenker | C04B 35/26 106/287.1 |
| 4,289,114 | A | * | 9/1981 | Zadiraka | F22G 5/12 122/487 |
| 5,294,078 | A | * | 3/1994 | Gurr | B64G 5/00 244/116 |

(Continued)

FOREIGN PATENT DOCUMENTS

CN         1170074 A    1/1998
CN      101435415 A    5/2009
(Continued)

*Primary Examiner* — Elizabeth A Quast
(74) *Attorney, Agent, or Firm* — Dority & Manning, P.A.

(57) ABSTRACT

A concentrated solar tower assembly includes a hollow tower structure defining lower and upper portions. The lower portion includes a closable opening region for configuring a closable opening, and the upper portion includes a top gird having inner and outer top grids. The assembly further includes a solar receiver steam generator entirely installed at the ground level G on the inner top grid simultaneous to erection of the tower. The generator on the inner top grid is slidingly directed within the tower from the closable opening to be entirely accommodated therewithin. Thereafter, the generator on the inner top grid is lifted for being placed along the upper portion of the tower.

14 Claims, 15 Drawing Sheets

(56) References Cited

U.S. PATENT DOCUMENTS

| | | | | |
|---|---|---|---|---|
| 5,450,695 A * | 9/1995 | Desai | ........................ | E21B 15/00 52/118 |
| 5,490,364 A * | 2/1996 | Desai | .................. | E21B 41/0071 52/121 |
| 5,826,387 A * | 10/1998 | Henderson | .............. | E02D 27/42 405/249 |
| 6,888,264 B1 * | 5/2005 | Willis | ..................... | F03D 1/001 290/44 |
| 8,191,257 B2 * | 6/2012 | Reiner | .................. | F22B 37/001 237/58 |
| 8,353,141 B2 * | 1/2013 | Berg | ........................ | F03D 1/001 52/114 |
| 8,601,748 B2 * | 12/2013 | Delago | ................... | F03D 1/001 52/119 |
| 2002/0162283 A1 * | 11/2002 | Benson | ................... | E04H 12/34 52/123.1 |
| 2005/0166521 A1 * | 8/2005 | Silber | ..................... | E04H 12/10 52/633 |
| 2008/0190058 A1 * | 8/2008 | Migliore | ................. | E02D 27/42 52/295 |
| 2009/0087311 A1 * | 4/2009 | Wyborn | .................. | E04H 12/08 416/9 |
| 2010/0199979 A1 * | 8/2010 | Plotkin | ....................... | F24J 2/07 126/704 |
| 2010/0293781 A1 * | 11/2010 | Foo | ........................ | B63B 35/003 29/791 |
| 2011/0232629 A1 * | 9/2011 | Mandel | ...................... | F24J 2/07 126/570 |
| 2014/0130793 A1 * | 5/2014 | Payne | .................... | B21D 53/02 126/663 |
| 2014/0260076 A1 * | 9/2014 | Yustus | ................... | E04H 12/344 52/745.18 |
| 2015/0052836 A1 * | 2/2015 | Kirkley | ................. | E04H 12/342 52/223.5 |

FOREIGN PATENT DOCUMENTS

| | | |
|---|---|---|
| CN | 102213033 A | 10/2011 |
| WO | 02/48500 | 6/2002 |
| WO | 2009/137445 | 11/2009 |

* cited by examiner

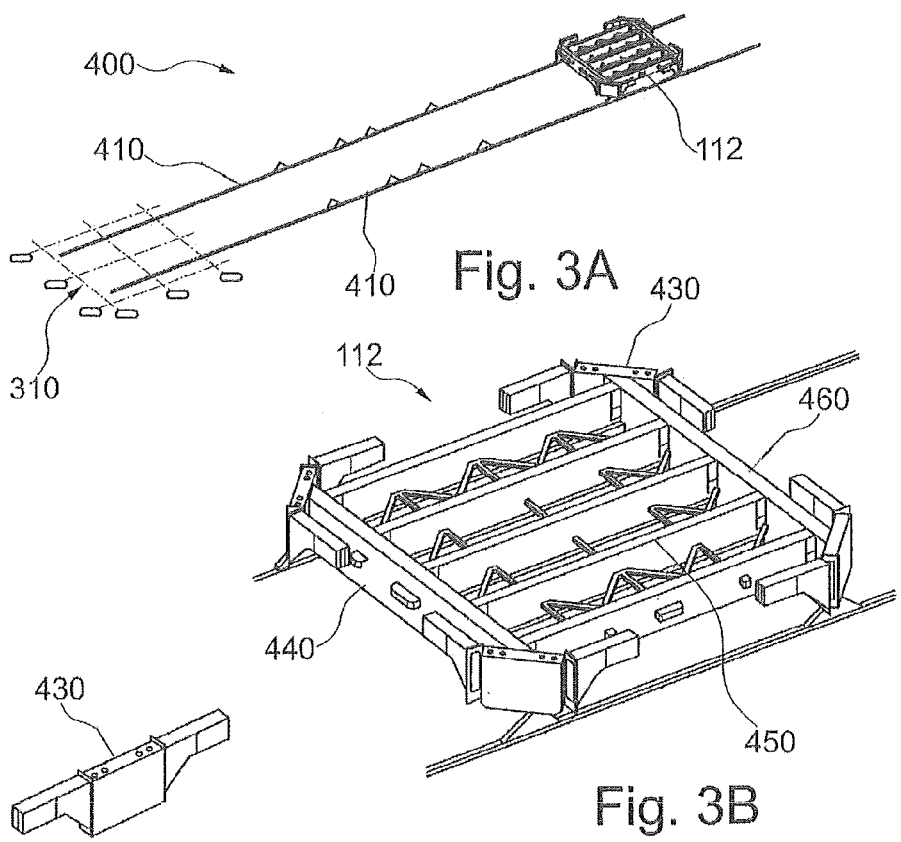
Fig. 3A
Fig. 3B
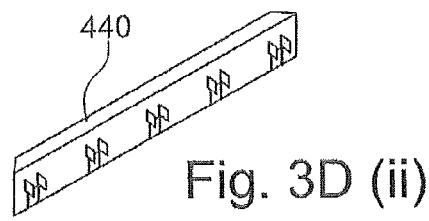
Fig. 3D (i)
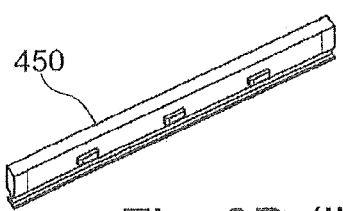
Fig. 3D (ii)
Fig. 3D (iii)
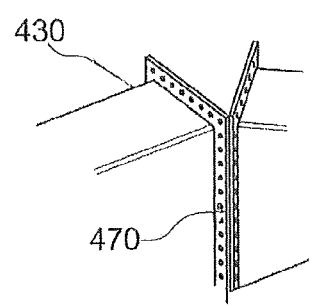
Fig. 3C

1

CONCENTRATED SOLAR TOWER ASSEMBLY AND METHOD

CROSS-REFERENCE TO RELATED APPLICATIONS

This application claims priority to European Application 12185059.8 filed Sep. 19, 2012, the contents of which are hereby incorporated in its entirety.

FIELD OF THE DISCLOSURE

The present disclosure relates to solar power plants, and, more particularly, to a rapid erection of a concentrated solar tower assembly having a solar tower and a solar receiver steam generator, in a concentrated solar power plant.

BACKGROUND OF THE DISCLOSURE

A concentrated solar power plant use a solar receiver located at an elevation of a support tower, where the sun rays are focused for utilizing the solar heat to produce electricity. In such plant, over all height of the solar tower and the solar receiver is a critical parameter to have such elevation where maximum sun rays may be focused on the solar receiver. In an example, the solar power plant producing 250 Mega-Watts (MW) of electricity, overall height of the solar tower and the solar receiver may be up to 250 meters. Further, overall weight of the solar receiver may also be very much, for example, up to 3500 tons.

Constructions of such concentrated solar power plant with such elevated solar tower and such heavy solar receiver is a challenge to industries due the numerous requirements, such as huge labor force, time and cost involved, and also due to pre-construction preparation, such as advance booking of tower cranes due to availability thereof in less numbers, etc.

The level of challenge may be understood by following example of a typical construction sequence of the concentrated solar tower in the solar power plant. While constructing the concentrated solar tower; firstly, erection of the solar tower is done, and then, secondly, erection of the solar receiver on the top of the solar tower, by utilizing tower cranes, is done. Such construction sequence involves a lot of time, labor force and cost, as erection activities are done in sequence, erection of the solar tower and then erection of the solar receiver on the top of the solar tower. Further, the concentrated solar tower construction sequence also involves a lot of erection activities at high elevation and may be very dangerous for construction personnel safety.

SUMMARY

The present disclosure provides concentrated solar tower assembly and method that will be presented in following simplified summary to provide a basic understanding of one or more aspects of the disclosure that are intended to overcome the discussed drawbacks, but to include all advantages thereof along with providing some additional advantages. This summary is not an extensive overview of the disclosure. It is intended to neither identify key or critical elements of the disclosure, nor to delineate the scope of the present disclosure. Rather, the sole purpose of this summary is to present some concepts of the disclosure, its objects and advantages in a simplified form as a prelude to the more detailed description that is presented hereinafter.

An object of the present disclosure is to provide construction method of a concentrated solar power plant that reduces the various challenges faced by the industries due the requirements, such as huge labor force, time and cost involved, and also due to pre-construction preparation. Another object of the present disclosure is to provide a construction method that is capable of reducing erection activities at high elevations. Another object of the present disclosure is to provide construction personnel safety. Various other objects and features of the present disclosure will be apparent from the following detailed description and claims.

The above noted and other objects may be achieved by a method for assembling a concentrated solar tower assembly for a solar power plant.

In one aspect of the method of the present disclosure, the method comprising: constructing a foundation base at a ground level; installing a sliding arrangement of a predetermined distance extending from the foundation base, and erecting an inner top grid capable of sliding on the sliding arrangement; erecting a hollow tower structure extending vertically from the foundation base, the hollow tower structure defining an upper portion and a lower portion, the upper portion having a top grid obtained by coupling the inner top grid to an outer top grid, and the lower portion having a closable opening region for configuring a closable opening; erecting a solar receiver steam generator, at the ground level, on the inner top grid slidable on the sliding arrangement at a predetermined distance from the hollow tower structure, simultaneous to the hollow tower structure erection; placing a lifting system on the outer top grid, the lifting system having at least one tension cable extending downwardly from the outer top grid; sliding the solar receiver steam generator along with the inner top grid on the sliding arrangement from the predetermined distance to within the hollow tower structure from the closable opening of the lower portion and subsequently closing the closable opening; hoisting the solar receiver steam generator along with the inner top grid, for travelling from the lower portion to up to the upper portion within the hollow tower structure, by the lifting system; and coupling the inner top grid having the solar receiver steam generator with the upper top grid for placing the solar receiver steam generator on the top gird along the upper portion.

In one embodiment of the above aspect, constructing a foundation base comprises: forming a retention reinforcement at the ground level; and installing a micropile reinforcement over the retention reinforcement. Further, installing the micropile reinforcement comprises: arranging a plurality of corrugated piping members extending vertically from the retention reinforcement and installing a steel template and a shear force box in conjunction to the plurality of corrugated piping members; installing a cement mortar for holding the plurality of corrugated piping members along with the steel template and the shear force box; and inserting a threaded rod in each of the plurality of corrugated piping members for being configured with the plurality of corrugated piping members, the steel template and the shear force box.

In one embodiment of the above aspect, installing the sliding arrangement comprises: arranging rail members on the ground level up to the predetermined distance from the foundation base; and installing preassembled bracings with the rail members.

In one embodiment of the above aspect, erecting the inner top grid on the sliding arrangement comprises: arranging a plurality of primary and secondary girders in a manner for configuring a flat horizontal platform; and coupling a plurality of lifting girders hingedly to the platform.

In one embodiment of the above aspect, the lifting system includes a plurality of tension cable extending downwardly from the outer top grid for coupling each of the plurality of lifting girder hingedly to the platform. The lifting system may be at least one of a hydraulically, pneumatically, mechanically and electronically controlled lifting system.

In one embodiment of the above aspect, erecting the hollow tower structure comprises: installing a plurality of vertical steel sub-columns extending from the foundation base to erect the plurality of vertical columns, and simultaneously installing preassembled bracings and girders to the plurality of vertical columns for configuring the lower and upper portions;

erecting the outer top grid along the upper portion of the hollow tower structure; and uninstalling a selected preassembled bracings and girders from the lower portion of the hollow tower structure to configure the closable opening, from which the solar receiver steam generator is slid within the hollow tower structure, capable of being closed by further installing the preassembled bracings and girders. In alternative, the hollow tower structure may be in concrete instead of steel columns. Such hollow tower structure may be erected by a concrete mixture vertically disposed over and above the other extending from the foundation base.

In one embodiment of the above aspect, the hollow tower structure includes a footprint area greater than the solar receiver steam generator to accommodate the solar receiver steam generator within the hollow tower structure for lifting thereto from the lower portion to up to the upper portion.

In one embodiment of the above aspect, erecting the hollow tower structure further comprises erecting an auxiliary assembly in conjunction with the erection of the lifting system, the auxiliary assembly capable of being dismantled upon the lifting of the solar receiver steam generator along with the inner top grid, up to the upper portion of the hollow tower structure. In one embodiment of the above aspect, coupling the inner top grid with the upper top grid to configure the top grid comprises erecting pre-assembled bracing in conjunction with the inner top grid and the upper top grid along the upper portion of the hollow tower structure.

In further embodiment, the method further comprises configuring at least one lift and stair case to the hollow tower structure for transportation of utility along the hollow tower structure.

In one embodiment of the above aspect, the method further comprises dismantling the lifting system and the sliding arrangement.

In another aspect a concentrated solar tower assembly for a solar power plant is provided. The concentrated solar tower assembly comprises a hollow tower structure and a solar receiver steam generator. The hollow tower structure extends vertically from a ground level. The hollow tower structure includes lower and upper portions, the lower portion has a closable opening region for configuring a closable opening, and the upper portion has a top gird. The top grid includes an inner top grid and an outer top grid coupled together to each other. Further, the solar receiver steam generator entirely installed at the ground level on the inner top grid for being slidingly directed within the hollow tower structure from the closable opening configured along the closable opening region to be entirely accommodated within the hollow tower structure. The solar receiver steam generator on the inner top grid is being lifted from within the lower portion to up to the upper portion of the hollow tower structure for placing the solar receiver steam generator at the upper portion by coupling the inner upper grid to the outer upper grid.

These together with the other aspects of the present disclosure, along with the various features of novelty that characterized the present disclosure, are pointed out with particularity in the claims annexed hereto and form a part of the present disclosure. For a better understanding of the present disclosure, its operating advantages, and the specified object attained by its uses, reference should be made to the accompanying drawings and descriptive matter in which there are illustrated exemplary embodiments of the present disclosure.

BRIEF DESCRIPTION OF THE DRAWINGS

The advantages and features of the present disclosure will better understood with reference to the following detailed description and claims taken in conjunction with the accompanying drawing, wherein like elements are identified with like symbols, and in which:

FIGS. 3A, 3B, 3C and 3D (i) to 3D (iii) illustrate a sliding arrangement and an inner top grid and their erection for installing the concentrated solar tower assembly of FIG. 1, in accordance with an exemplary embodiment of the present disclosure;

Like reference numerals refer to like parts throughout the description of several views of the drawings.

DETAILED DESCRIPTION

For a thorough understanding of the present disclosure, reference is to be made to the following detailed description, including the appended claims, in connection with the above-described drawings. In the following description, for purposes of explanation, numerous specific details are set forth in order to provide a thorough understanding of the present disclosure. It will be apparent, however, to one skilled in the art that the present disclosure can be practiced without these specific details. In other instances, structures and devices are shown in block diagrams form only, in order to avoid obscuring the disclosure. Reference in this specification to "one embodiment," "an embodiment," "another embodiment," "various embodiments," means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but may not be of other embodiment's requirement.

Although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure. Further, the terms "inner," "outer," "upper," "lower" and the like, herein do not denote any order, elevation or importance, but rather are used to distinguish one element over another. Further, the terms "a," "an," and "plurality" herein do not denote a limitation of quantity, but rather denote the presence of at least one of the referenced item.

Figure 1:
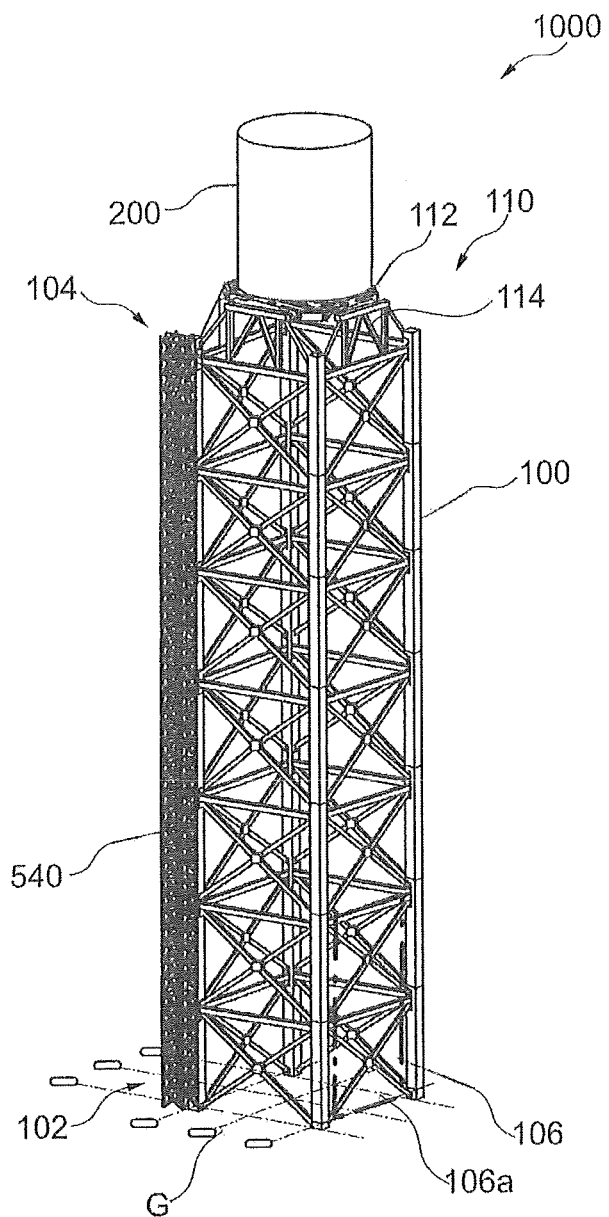
FIG. 1 illustrates a concentrated solar tower assembly, in accordance with an exemplary embodiment of the present disclosure.

Referring now to FIG. 1, a concentrated solar tower assembly 1000 for a solar power plant (not shown) is illustrated in accordance with an exemplary embodiment of the present disclosure. The concentrated solar tower assembly 1000 includes a hollow tower structure 100 (hereinafter referred to as 'tower 100') and a solar receiver steam generator 200 (hereinafter referred to 'SRSG 200') placed at the top thereof. The tower 100 extends vertically from a ground level G, and defines a lower portion 102 and an upper portion 104 and a portion extending therebetween. The lower portion 102 includes a closable opening region 106 for configuring a closable opening 106a (depicted by dotted lines). The upper portion 104 includes a top gird 110, which includes an inner top grid 112 and an outer top grid 114 coupled together to each other. Further, the SRSG 200 entirely installed at the ground level G on the inner top grid 112 and is slidingly directed within the tower 100 from the closable opening 106a to be entirely accommodated within the tower 100. The SRSG 200 on the inner top grid 112 is being lifted from within the lower portion 102 to up to the upper portion 104 of the tower 100 for placing the SRSG 200 at the upper portion 104 by coupling the inner top grid 112 to the outer top grid 114 to obtain the top grid 110. The tower 100 may be erected by utilizing suitable numbers of cranes.

Figure 8A:
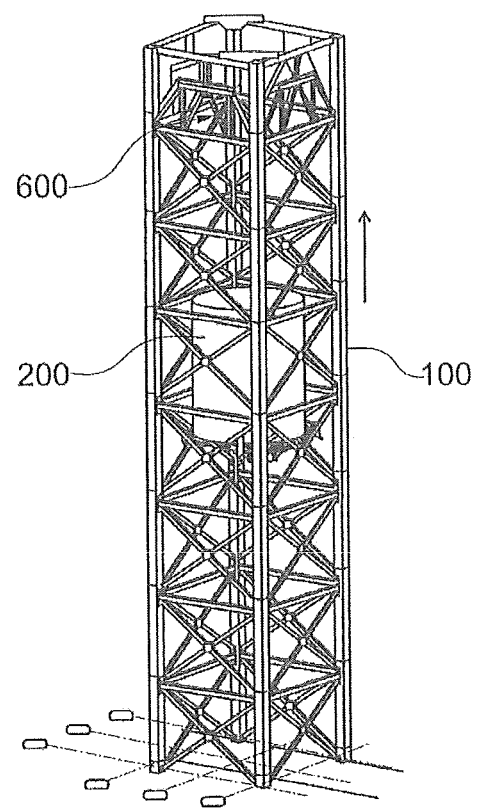
FIGS. 8A to 8D illustrate the solar receiver steam generator and the hollow tower structure assemblage by lifting the solar receiver steam generator upwardly within the hollow tower structure and installing thereat for installing the concentrated solar tower assembly of FIG. 1, in accordance with an exemplary embodiment of the present disclosure.
Figure 8B:
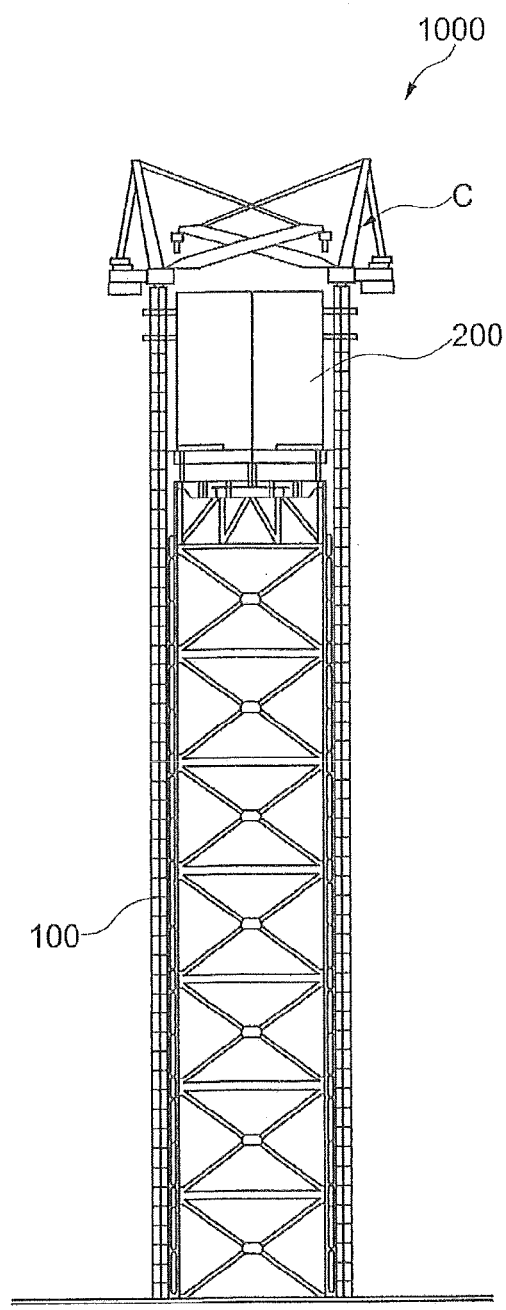
Figure 8C:
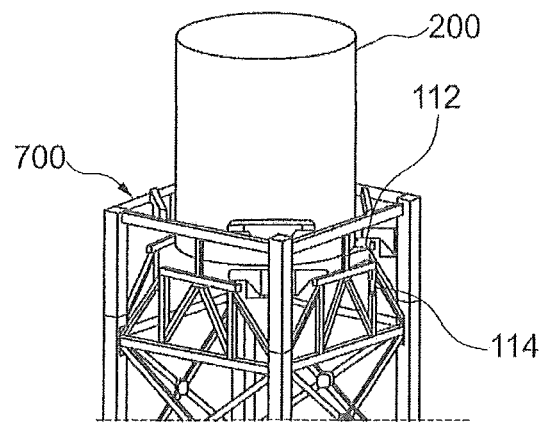
Figure 8D:
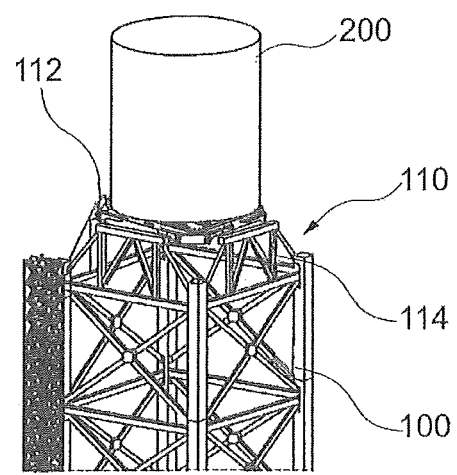
Figure 9A:
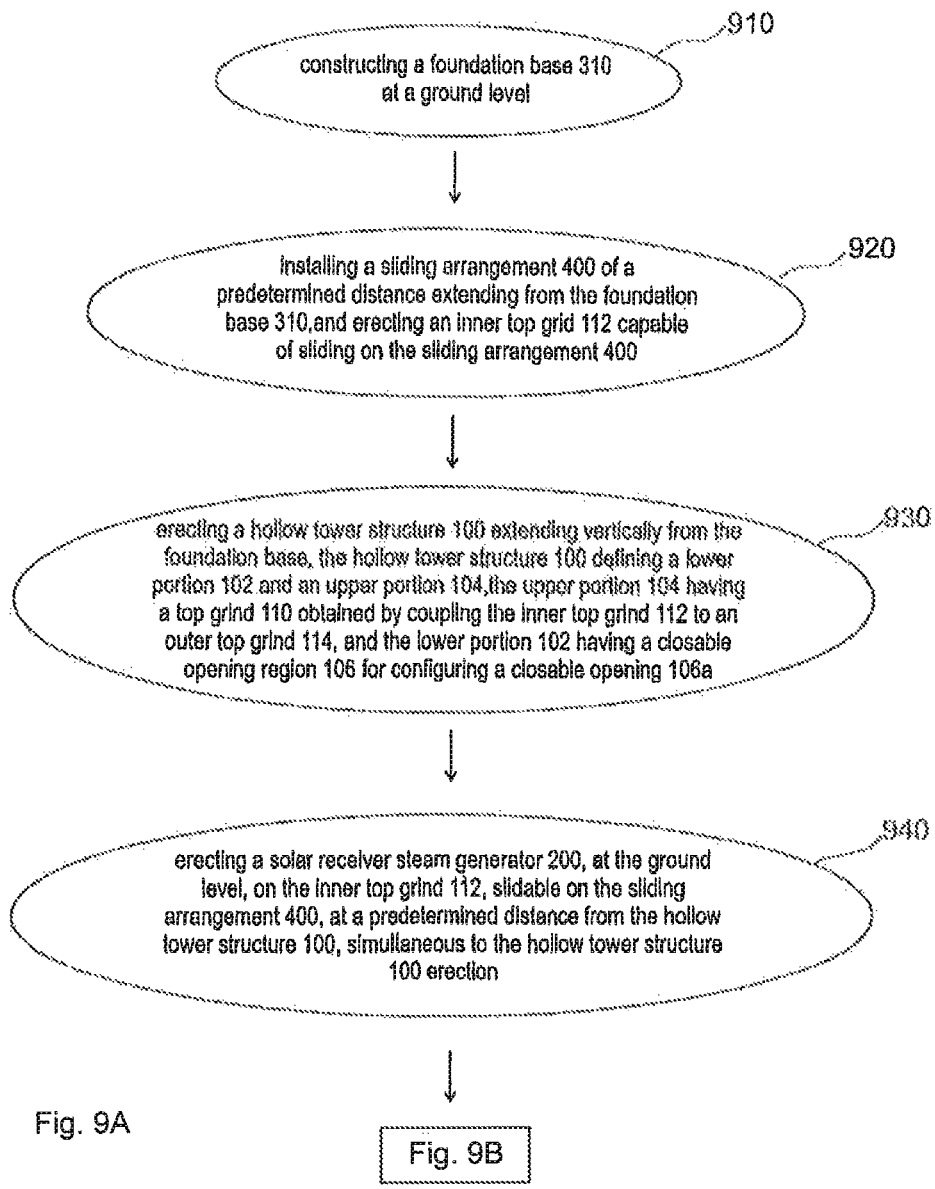
FIGS. 9A and 9B illustrate a flow diagram of method for construction of the concentrated solar tower assembly of FIG. 1, in accordance with an exemplary embodiment of the present disclosure.
Figure 9B:
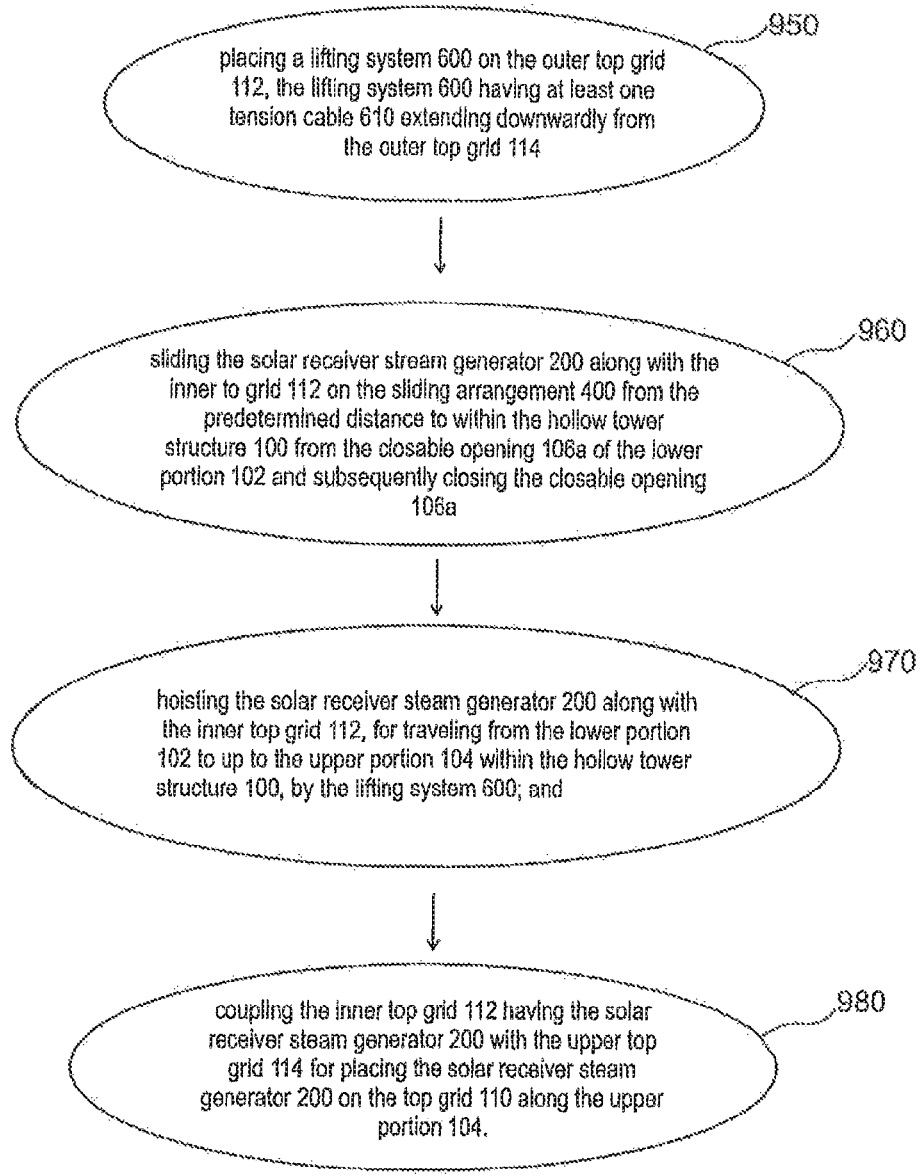

Constructional details and sequences of the tower 100 and the SRSG 200 of the concentrated solar tower assembly 1000 are illustrated in FIGS. 9A and 9B, which is a flow diagram of a method 900 for construction of the concentrated solar tower assembly 1000 of FIG. 1, in accordance with an exemplary embodiment of the present disclosure. FIG. 1 in conjunction to FIGS. 9A and 9B will be greatly explained with the reference of FIGS. 2A to 8D.

Figure 2A:
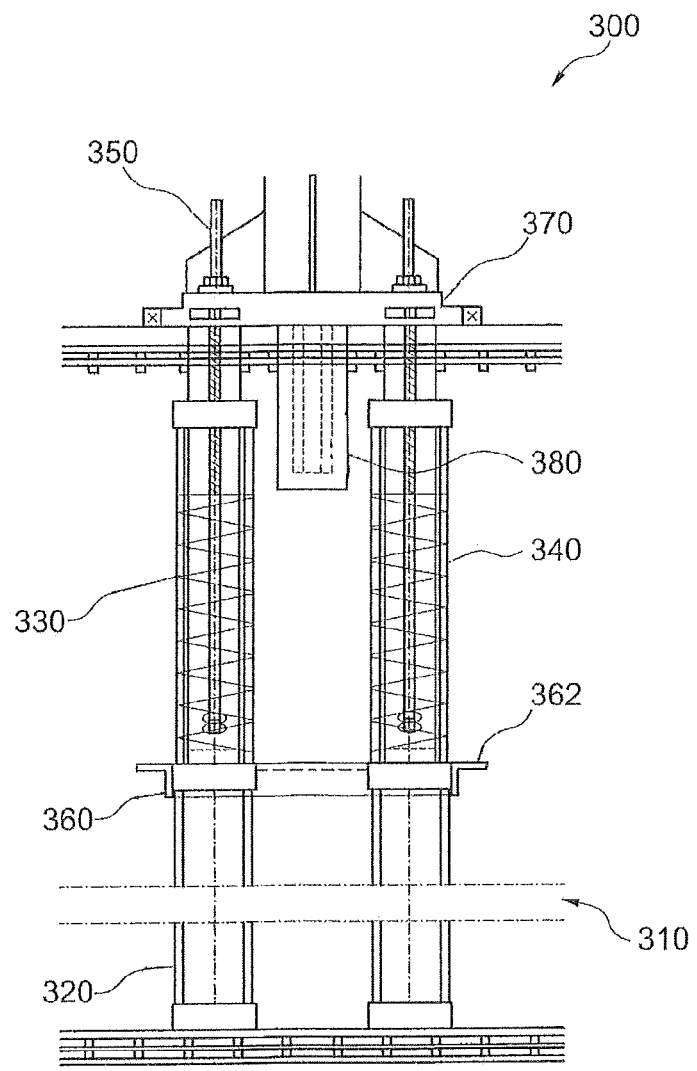
FIGS. 2A to 2G illustrate various components and sequences of construction of foundation works of the concentrated solar tower assembly of FIG. 1, in accordance with an exemplary embodiment of the present disclosure.

Referring now to FIGS. 2A to 2G, wherein various components and sequences of construction of foundation works 300 of the concentrated solar tower assembly 1000 of FIG. 1 are illustrated, in accordance with an exemplary embodiment of the present disclosure, to construct a foundation base 310 depicted at 910 of the method 900 of FIGS. 9A and 9B. FIG. 2A illustrates the completely formed foundation base 310 of the foundation works 300, and will be explained in conjunction with FIGS. 2B to 2G.

As depicted in FIG. 2A, the construction of the concentrated solar tower assembly 1000 starts with the foundation works 300. The foundation base 310 is constructed at the ground level G. For constructing the foundation base 310, the ground is excavated and a retention reinforcement 320 therewithin is formed. The retention reinforcement 320 may be obtained by filling sand, soil, rock or concrete within a portion of the excavated land for erosion control, soil stabilization on flat ground and steep slopes, channel protection, and structural reinforcement for load support and earth retention. Further, a micropile reinforcement 330 is formed over the retention reinforcement 320. The micropile reinforcement 330 may be obtained by installing a plurality of corrugated piping members 340 (herein after referred to as 'corrugated pipes 340') and a plurality of threaded rods 350 (herein after referred to 'threaded rods 350') in conjunction with each other.

Figure 2B:
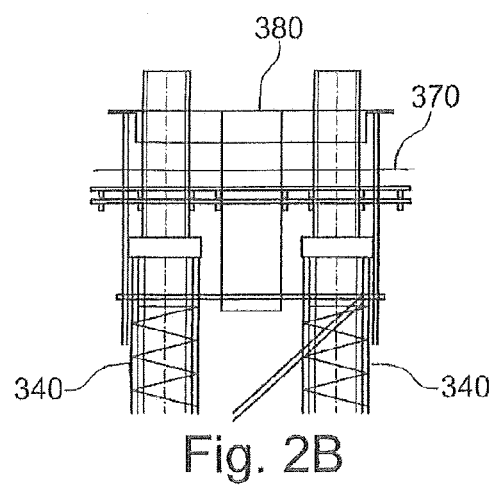

In one embodiment, the micropile reinforcement 330 may be obtained in two installation levels. In a first installation level, as depicted in FIGS. 2B and 2D and described in conjunction of FIG. 2A, the corrugated pipes 340 are installed with the help of a cement mortar 360 and a limit-plates or an angle frame 362. In a preferred embodiment, the corrugated pipes 340 are four in numbers arranged in a square or a rectangle patterns and extends vertically from corners and supported by the cement mortar 360 and the limit-plates 362 on the retention reinforcement 320. However, without departing from the scope of present disclosure, any suitable number of the corrugated pipes 340 may be utilized, according to need of construction of type of the tower 100. Further, a template 370, preferably made of steel, along with a shear force box 380, for distributing exerted shear force of the tower 100 uniformly thereto and providing overall strong foundation base 310 are installed with the corrugated pipes 340.

Figure 2C:
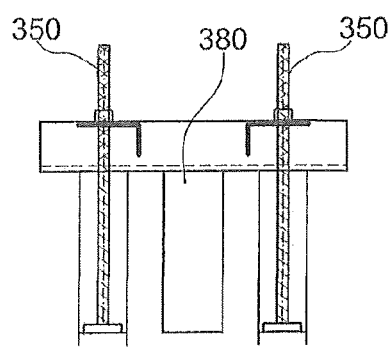
Figure 2E:
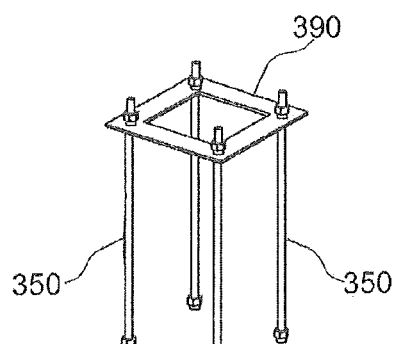
Figure 2F:
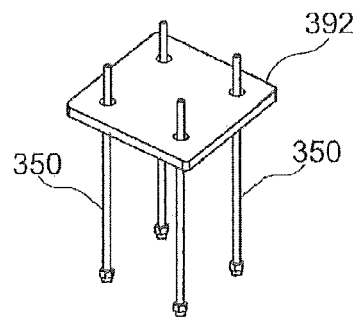
Figure 2D:
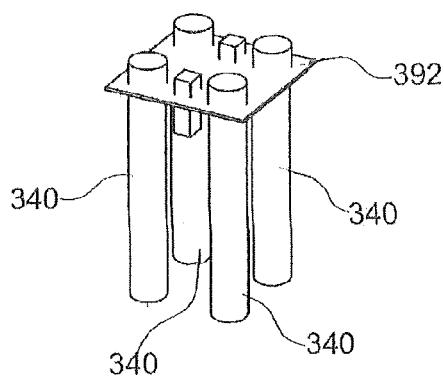
Figure 2G:
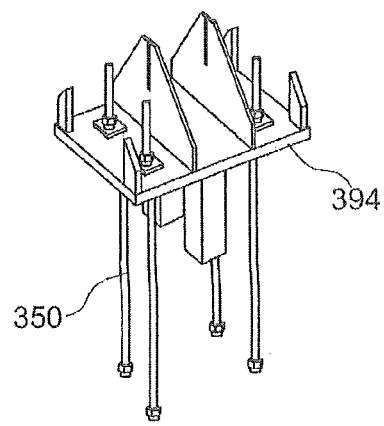

Further, in a second installation level, as depicted in FIGS. 2C and 2F to 2G and described in conjunction of FIG. 2A, the threaded rods 350 are inserted in the corrugated pipes 340. The threaded rod 350, one of many, may be inserted in each of the corrugated pipes 340 for being configured, along with the steel template 370 and the shear force box 380, to the corrugated pipes 340. Configuration thereof the may be obtained in combination of base plates 390, 392 and 394. As against the above described embodiment, in another embodiment, the micropile reinforcement 330 may be constructed in single installation phase. The foundation base 310 obtained as a result of construction of the foundation works 300 are further utilized for erection of the tower 100 by utilizing cranes.

Referring now to FIGS. 3A to 3D, wherein a sliding arrangement 400 and the inner top grid 112 and erection thereof for installing the concentrated solar tower assembly 1000 of FIG. 1, in accordance with an exemplary embodiment of the present disclosure, are illustrated to construct the sliding arrangement 400 depicted at 920 of the method 900 of FIGS. 9A and 9B. Specifically, FIG. 3A illustrates erection of the sliding arrangement 400, and FIG. 3B illustrates the inner top grid 112 on the sliding arrangement 400 and erection thereof.

Figure 4A:
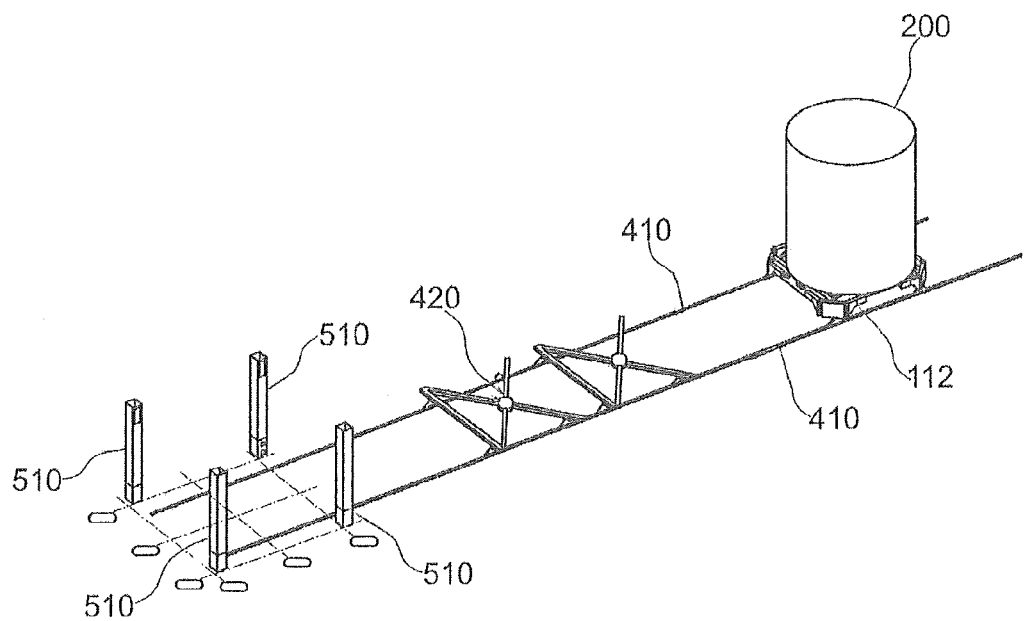
FIGS. 4A to 4D illustrate a hollow tower structure and a solar receiver steam generator simultaneous erection and their associated components for installing the concentrated solar tower assembly of FIG. 1, in accordance with an exemplary embodiment of the present disclosure.

The sliding arrangement 400 is installed at the ground level G up to a predetermined distance from the foundation base 310 and thereafter the inner top grid 112 is erected over the sliding arrangement 400 for being slidable thereon. The sliding arrangement 400 is installed by arranging rail members 410 in a spaced apart relationship on the ground level G up to the predetermined distance from the foundation base 310. The predetermined distance may for example be about 100 meters to about 300 meters extending from the foundation base 310, without departing other scope of distances from the present disclosure. Further, the preassembled bracings 420 may be installed with the rail members 410 for strengthening the rails members assembly 410 to configured the strong sliding arrangement 400 so that it may be capable of withholding and carrying heavy weight of the SRSG 200, for example about 1400 tons or more, that will be erected over the inner top grid 112, slidable on the rail members 410. The preassembled bracings 420 may be assembled while installing the rail members 410 or may be installed while installing the tower 100, as depicted in FIG. 4A.

The inner top grid 112 is erected over the sliding arrangement 400 by assembling a plurality of lifting girders 430 and a plurality of primary and secondary girders 440, 450, as shown in FIG. 3D (i) to (iii), respectively, to each other. The primary and secondary girders 440, 450 are arranged in a manner to configure a flat horizontal platform 460. Further, the lifting girders 430 are hingedly 470 (see FIG. 3C) coupled to the flat horizontal platform 460 at along each corner thereof, as shown in FIG. 3B. The lifting girders 430 facilitate in lifting of the inner top grid 112 over the upper portion 104 of the tower 100, without any collisions with the tower 100. Erection or assembly of the inner top grid 112 and the sliding arrangement 400 may be achieved by utilizing tower cranes.

Referring to FIGS. 4A to 4D, the tower 100 and the SRSG 200 simultaneous erection and their associated components are illustrated, in accordance with an exemplary embodiment of the present disclosure, to simultaneously construct the tower 100 and the SRSG 200, as depicted at 930 and 940 of the method 900 of FIGS. 9A and 9B. In a preferred embodiment, the tower 100 is made up of steel structure. However, without departing form the scope of the present disclosure, the tower 100 may be made of concrete or any other suitable material that are capable of withstanding heavy loads of the SRSG 200 and as well as self-load. For installing the tower 100 of the steel structure, vertical columns 500 are erected by utilizing a plurality of vertical steel sub-columns 510, which are assembled to the foundation base 310 in the vertical manner by the tower cranes. Similarly, for installing the tower 100 made of concrete, erecting the tower 100 includes erecting a concrete mixture vertically over and above the other extending from the foundation base. Hereinafter, further explanation of the tower 100 may be done with respect to the tower made of steel, without limiting its scope thereto, but the explanation made in that respect may considered to be extending in the scope to the tower made of concrete or any other material.

At the same time, when the tower 100 is being erected, the SRCG 200 is also being erected on the inner top grid 112 over the sliding arrangement 400 by utilizing various tower cranes, thereby saving a lot of time as against subsequent erection.

Figure 4B:
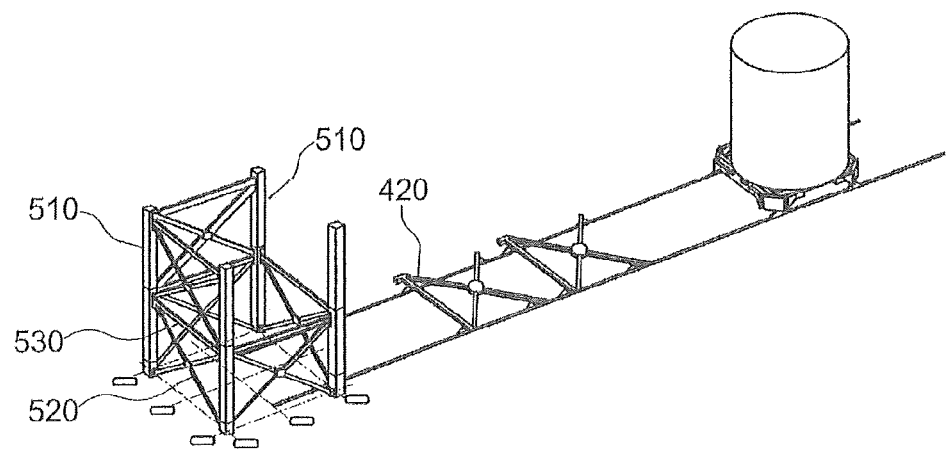
Figure 4C:
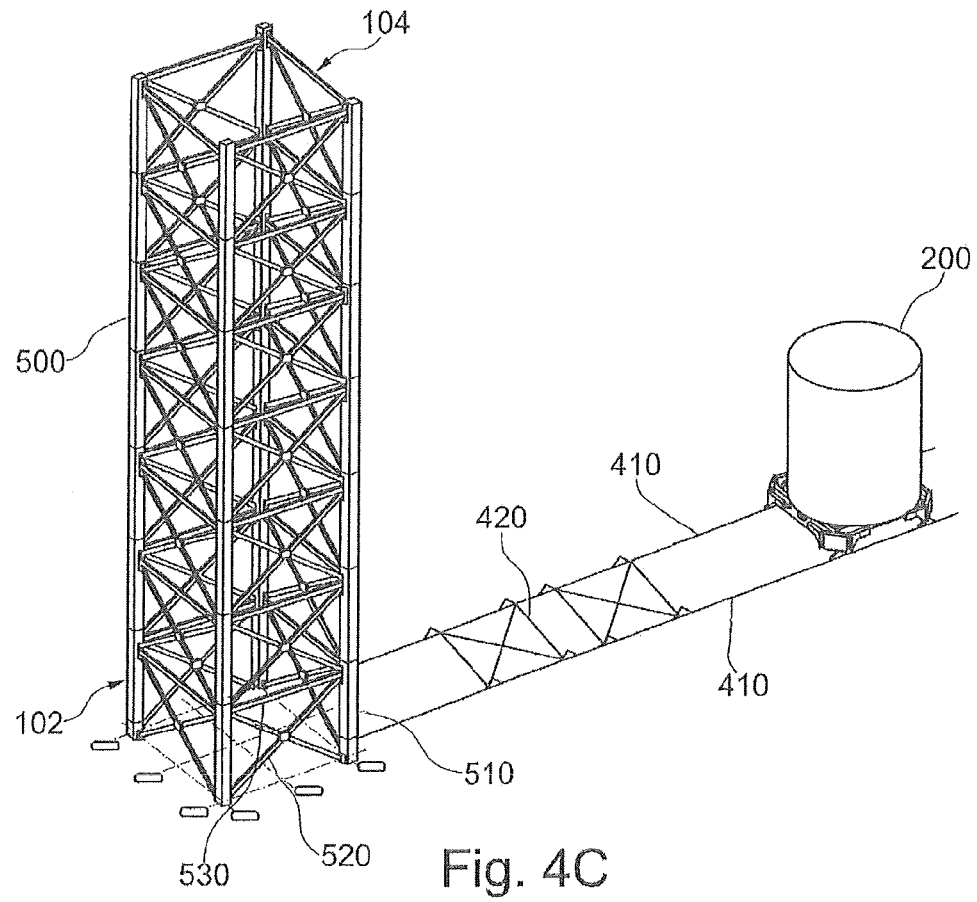

As illustrated in FIG. 4A, the vertical steel columns 500 is erected on the foundation base 310 extending therefrom, by coupling a first set of vertical steel sub-columns 510 to the threaded rods 350, and at the same time the SRSG 200 is being erected on the inner top grid 112. As also depicted, the preassembled bracings 420 of the sliding arrangement 400 may also be assembled while erection of the tower 100 and the SRSG 200 as against earlier erection thereof as described herein above. This sequence may save further time in over all erection of the concentrated solar tower assembly 1000. The first set of vertical steel sub-columns 510 are coupled to the threaded rod 350. Further, as depicted in FIGS. 4B and 4C, the steel vertical steel sub-columns 510 are coupled to other vertical steel sub-columns 510 to obtain a predetermined size of the tower 100, for example, up to 100 meters to 300 meters. Further, preassembled bracings 520 and girders 530 are also coupled concomitantly with the vertical steel sub-columns 510 for strengthening and rigidifying the structure of the tower 100.

The tower 100 is erected up to the predetermined height, and upon its configuration, it defines the lower 102 and upper portions 104 and the portion extending therebetween. Simultaneously, the SRSG 200 is also being erected along with the complete installation of wirings and cablings on the inner top grid 112 at the predetermined distance from the tower 100. Further, the SRSG 200 is also being tested about is functioning and operations at the ground level G. The tower 100 has a footprint area greater than the area of the SRSG 200 to accommodate thereto within itself so that it may be lifted from within the tower 100 from the lower portion 102 to up to the upper portion 104, and will be explained herein later.

Figure 4D:
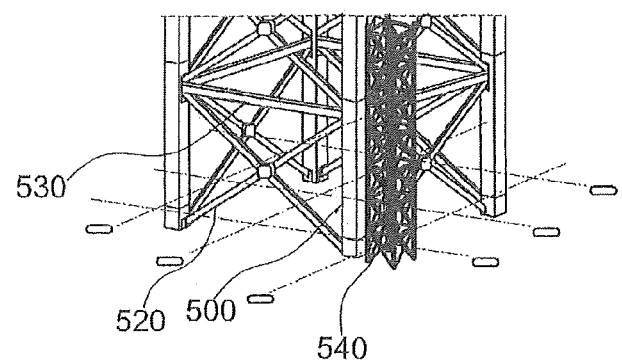

Further, FIG. 4D illustrates at least one lift and stair case 540 to the tower 100 for transportation of utility therealong. The lift or stair case 540 may be installed in a similar fashion by utilizing cranes to configure columns on along any one of the vertical columns 500 from the lower portion 102 to up to the upper portion 104 of the tower 100. The lift or stair case 540 may simultaneously be installed in a similar fashion while erecting the tower 100 to save time of overall erection or may be installed after the tower 100 is installed completely, depending upon the requirement or preferences.

Figure 5A:
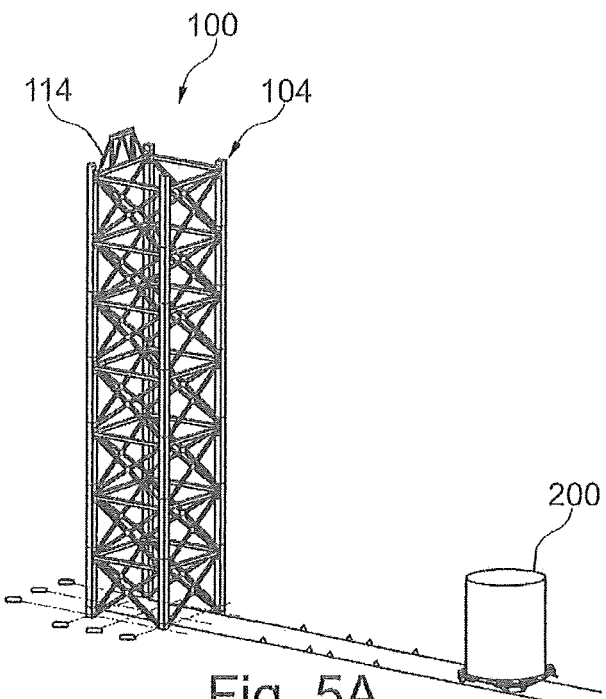
FIGS. 5A to 5D illustrate a lifting system, an auxiliary assembly and upper top grid and erection thereof in conjunction to each other for installing the concentrated solar tower assembly of FIG. 1, in accordance with an exemplary embodiment of the present disclosure.
Figure 5B:
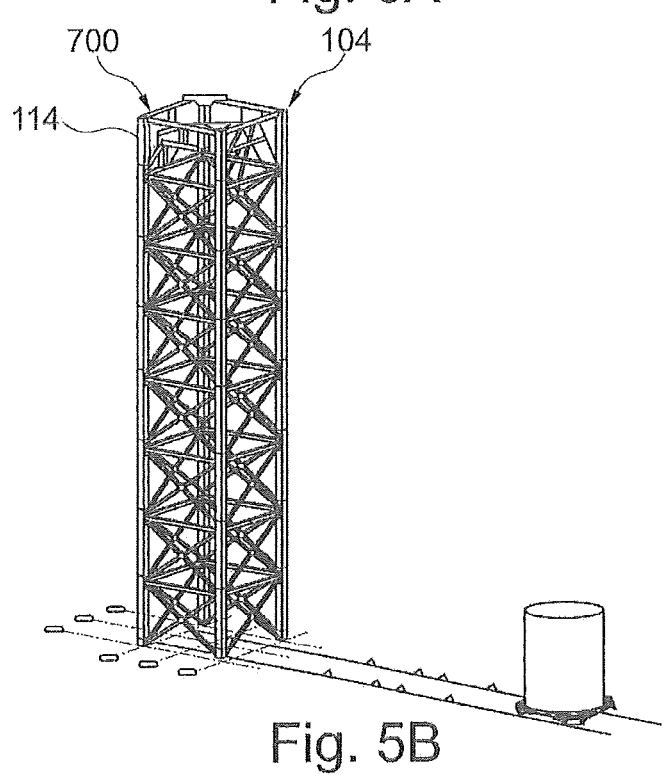
Figure 5C:
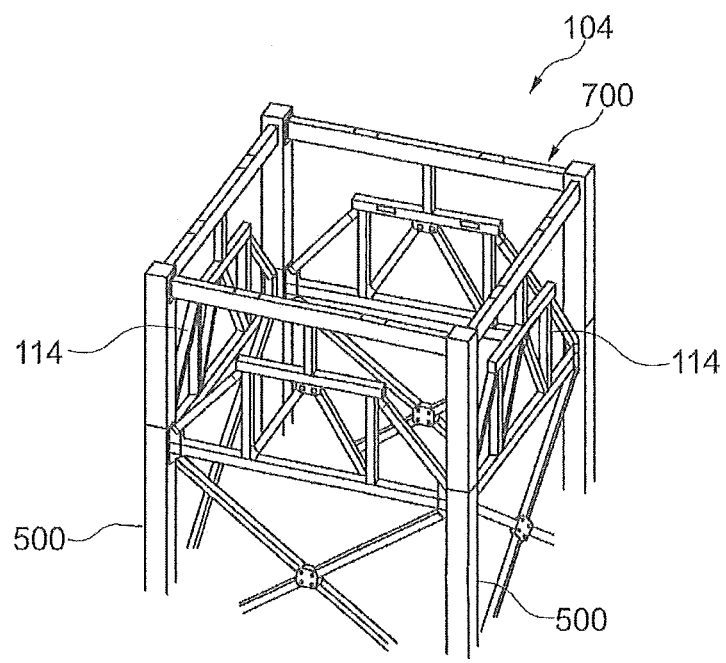

Referring now to FIGS. 5A to 5D, wherein further components, such as a lifting system 600, an auxiliary assembly 700 and the outer top grid 114 and concomitant erection thereof at around the upper portion 104 of the tower 100 for lifting the SRSG 200, are illustrated, as depicted at 950 of the method 900 of FIGS. 9A and 9B, in accordance with an exemplary embodiment of the present disclosure. In FIG. 5A, the outer top grid 114 is shown to be erected at along the upper portion 104 of the tower 100 by utilizing girders and bracing. Further, as shown in FIG. 5B, the auxiliary assembly 700 is being erected at along the upper portion 104 of the tower 100 around the outer top grid 114 by utilizing girders and bracings. Enlarge view of the upper portion 104 of the tower 100 is depicted in FIG. 5C.

Figure 5D:
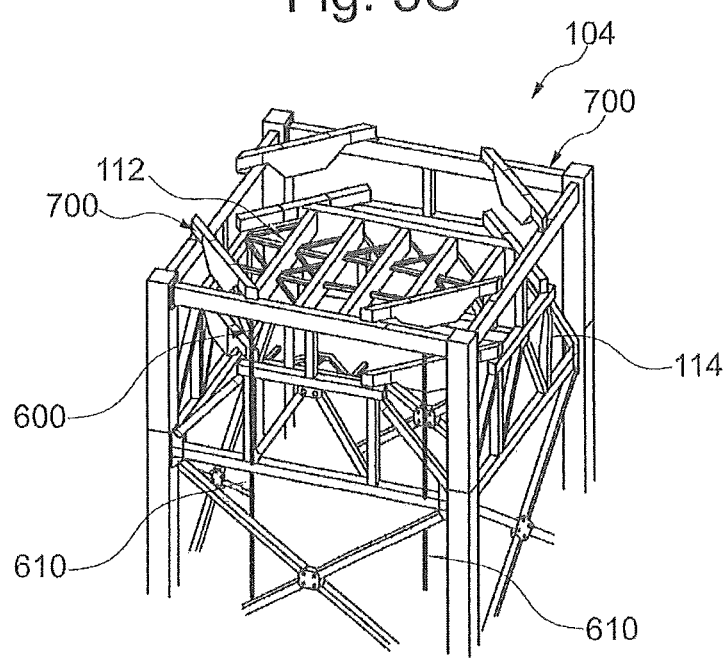

The auxiliary assembly 700 facilitates in erection of the lifting system 600 for lifting the SRSG 200 with the inner top grid 112. In FIG. 5D, the complete configuration of the upper portion 104 having the auxiliary assembly 700, the lifting system 600, the outer top grid 114 and the inner top grid 112 are shown for understanding the assembly thereof with each other. The auxiliary assembly 700 may be a temporary structure for supporting the lifting system 600 and may be dismantled after facilitating the lifting of the SRSG 200. Concomitantly, the lifting system 600 is placed along the upper portion 104 in coordination with the auxiliary assembly 700. The lifting system 600 includes at least one tension cable 610 extending downwardly from proximity to the outer top grid 114, as shown in FIG. 5D. Generally, one tension cable 610 is configured with each corner of the auxiliary assembly 700 for coupling each of the plurality of lifting girders 430 of the flat horizontal platform 460 of the inner top grid 112 for safely lifting the SRSG 200. However, without departing from the scope of the present disclosure, any number of tension cables 610 may be configured for safely lifting the SRSG 200. The lifting system 600 may be operated from at least one of a hydraulically, pneumatically, mechanically and electronically controlled means.

Figure 6:
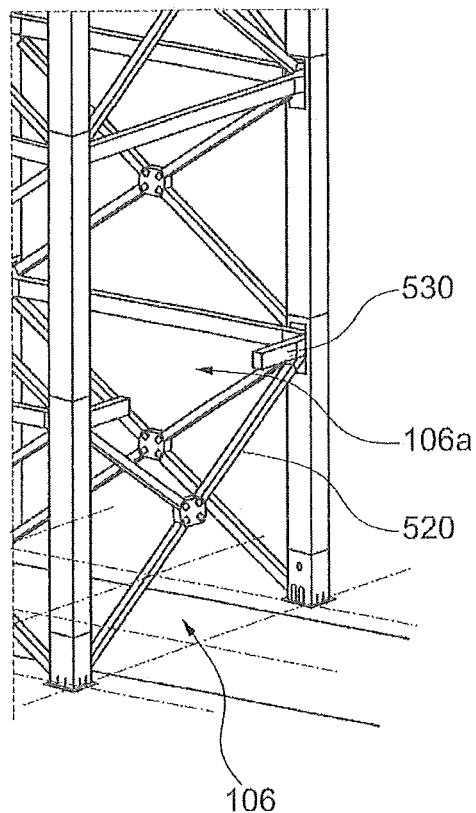
FIG. 6 illustrates a closable opening configuration on the hollow tower assembly of FIG. 1, in accordance with an exemplary embodiment of the present disclosure.

Upon erection of the tower 100 along with the lifting system 600, the auxiliary assembly 700 and the outer top grid 114 at the upper portion 104, selected number of preassembled bracings 520 and girders 530 from the lower portion 102 of the tower 100 are uninstalled. Specifically, around the closable opening region 106, the selected preassembled bracings 520 and girders 530 are uninstalled to configure the closable opening 106a, as shown in FIG. 6. The closable opening 106a is of a size large enough to receive the large sized SRSG 200 therefrom with in the hollow steel tower 100. The closable opening 106a may be closed once the SRSG 200 is provided within the tower 100 by installing the uninstalled selected number of preassembled bracings 520 and girders 530 to the lower portion 102. The SRSG 200 may be provided within the tower 100 from the closable opening 106a by sliding on the sliding arrangement 400, and will be explained herein with reference to FIGS. 7A and 7B.

Figure 7A:
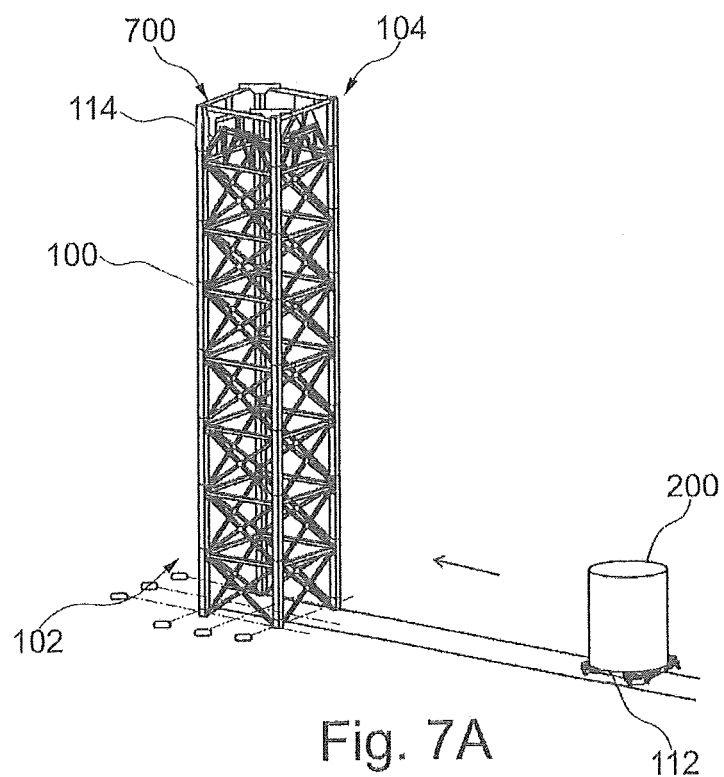
FIGS. 7A and 7B illustrate the solar receiver steam generator and the hollow tower structure assemblage by sliding the solar receiver steam generator within the hollow tower structure for installing the concentrated solar tower assembly of FIG. 1, in accordance with an exemplary embodiment of the present disclosure.
Figure 7B:
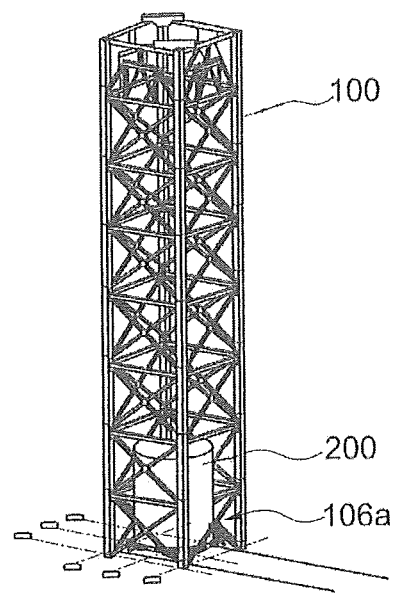

Referring now to FIGS. 7A and 7B, wherein the SRSG 200 and the tower 100 assemblage by sliding the SRSG 200 within the tower 100 for installing the concentrated solar tower assembly 1000 are illustrated, as depicted at 960 of the method 900 of FIGS. 9A and 9B, in accordance with an exemplary embodiment of the present disclosure. The SRSG 200 is slid along with the inner top grid 112 on the sliding arrangement 400 from the predetermined distance to within the tower 100 from the closable opening 106a. As shown in FIG. 7A, the SRSG 200 is being slid on the sliding arrangement 400 towards the closable opening 106a of the tower 100. Further, FIG. 7B illustrates the SRSG 200 being completely slid within the tower 100 and accommodated therein at the lower portion 102. Once the SRSG 200 is being completely slid within the tower 100, the closable opening 106a is subsequently closed by reconfiguring the uninstalled selected preassembled bracings 520 and girders 530. The closed closable opening 106a will again strengthen the tower 100 to facilitate the lifting of the SRSG 200 in effective manner, and will be explained herein with reference to FIGS. 8A to 8D.

In FIGS. 8A to 8D, there are illustrated the assemblage of the SRSG 200 and the tower 100 by lifting the SRSG 200 upwardly within the tower 100 and installing along the upper portion 104 of the tower 100, in accordance with an exemplary embodiment of the present disclosure. The lifting sequence may involve hoisting of the SRSG 200 on the inner top grid 112 as depicted at 970 of the method 900; then coupling of the inner top grid 112 having the SRSG 200 with the outer top grid 114 as depicted at 980 of the method 900 of FIGS. 9A and 9B. For lifting the SRSG 200 accommodated within the tower 100, the SRSG 200 with the inner top grid 112 is hoisted to the lifting system 600. Specifically, the each lifting girder 430 of the inner top grid 112 having the SRSG 200 is coupled with the tension cable 610 extending from the outer top grid 114 in turn coupling the flat horizontal platform 460 of the inner top grid 112 for safely lifting the SRSG 200 from the lower portion 102 to up to the upper portion 104 of the tower 100. Further, the lifting system 600 is actuated by at least one of a hydraulic, pneumatic, mechanical and electronically controlled means for exerting the lifting pressure below or on the inner top grid 112 to lift thereto, as depicted in FIG. 8A. The lifting system 600 is being actuated in very controlled and organized manner depending upon the environmental factors, such as wind speed and weather forecast of rain, for lifting operation.

The inner top grid 112 with the SRSG 200 is lifted up to the upper portion 104 where the outer top grid 114 is located. Upon reaching of the inner top grid 112 to up the outer top grid 114, the inner top grid 112 is hoisted with the outer top grid 114 by utilizing cranes 'C', as depicted in FIGS. 8B and 8C. Such hoisting of the inner top grid 112 with the outer top grid 114 configures the top grid 110 whereat the SRSG 200 is placed.

Furthermore, once the assemblage of the SRSG 200 with the tower 100 is done, the lifting and auxiliary assemblies 600, 700 supporting thereto are dismantled to form the assemblage of the tower 100 and the SRSG 200 with or without cranes, as depicted in FIG. 8D. Moreover, the sliding arrangement 400 is also dismantled, with or without cranes, to configure the concentrated solar tower assembly as depicted in FIG. 1.

The sequences of construction method of the concentrated solar tower assembly 1000 are advantageous in various scopes. There may be vast improvement of safety during the construction phase as the entire construction the SRSG 200, even including wiring, cabling and testing, is done on the ground level as against it is done today where the SRSG are entirely or partially constructed at the height of the tower. Further, there are also vast reductions of total time involved in construction of the concentrated solar tower assembly 1000 as the tower 100 and the SRSG 200 are simultaneously constructed as against today where the towers are constructed initially and then the SRSGs are constructed. There are also vast reduction of site cost as comparatively less involvement of labors work force and other machinery such as a large numbers of cranes etc. as it is required in today's construction of the plants. Furthermore, since the time involved in construction of the concentrated solar tower assembly 1000 is less due to above mentioned point, the plants operation may be started earlier thereby giving a possibility to client to earn revenue from the sale of the electricity in advance. Moreover, apart for the mentioned advantages, such construction method or sequences and the plant include various other advantages of the today's plants and method.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omission and substitutions of equivalents are contemplated as circumstance may suggest or render expedient, but such are intended to cover the application or implementation without departing from the spirit or scope of the claims of the present disclosure.

What is claimed is:

1. A method for assembling a concentrated solar tower assembly for a solar power plant, the method comprising:
   constructing a foundation base at a ground level;
   installing a sliding arrangement of a first predetermined distance extending from the foundation base, and erecting an inner top grid capable of sliding on the sliding arrangement;
   erecting a hollow tower structure extending vertically from the foundation base, the hollow tower structure defining a lower portion and an upper portion, the upper portion having a top grid obtained by coupling the inner top grid to an outer top grid, and the lower portion having a closable opening region for configuring a closable opening;

erecting a solar receiver steam generator, at the ground level, on the inner top grid, slidable on the sliding arrangement, at a second predetermined distance from the hollow tower structure, simultaneous to the hollow tower structure erection;

placing a lifting system on the outer top grid, the lifting system having at least one tension cable extending downwardly from the outer top grid;

sliding the solar receiver steam generator along with the inner top grid on the sliding arrangement from the second predetermined distance to within the hollow tower structure from the closable opening of the lower portion and subsequently closing the closable opening;

hoisting using the lifting system the solar receiver steam generator along with the inner top grid, from the lower portion to up to the upper portion within the hollow tower structure; and coupling the inner top grid having the solar receiver steam generator with the outer top grid for placing the solar receiver steam generator on a top gird of the upper portion, with said coupling comprising erecting a preassembled bracing in conjunction with the inner top grid and the outer top grid along the upper portion of the hollow tower structure.

2. The method of claim 1, wherein constructing the foundation base comprises:
forming a retention reinforcement at the ground level; and
installing a micropile reinforcement over the retention reinforcement.

3. The method of claim 2, wherein installing the micropile reinforcement comprises:
arranging a plurality of corrugated piping members extending vertically from the retention reinforcement and installing a steel template and a shear force box in conjunction to the plurality of corrugated piping members;
installing a cement mortar for holding the plurality of corrugated piping members along with the steel template and the shear force box; and
inserting a threaded rod in each of the plurality of corrugated piping members for configuration of the plurality of corrugated piping members, the steel template and the shear force box.

4. The method of claim 1, wherein installing the sliding arrangement comprises:
arranging rail members on the ground level up to the first predetermined distance from the foundation base; and
installing preassembled bracings with the rail members.

5. The method of claim 1, wherein erecting the inner top grid on the sliding arrangement comprises:
arranging a plurality of primary and secondary girders to configure a flat horizontal platform; and
coupling a plurality of lifting girders hingedly to the flat horizontal platform.

6. The method of claim 5, wherein the lifting system having a plurality of the at least one tension cable extending downwardly from the outer top grid for coupling each of the plurality of lifting girders hingedly coupled to the flat horizontal platform of the inner top grid.

7. The method of claim 5, wherein the lifting system is at least one of a hydraulically, pneumatically, mechanically and electronically controlled lifting system.

8. The method of claim 1, wherein erecting the hollow tower structure comprises:

installing a plurality of vertical columns extending upwardly from the foundation base to erect the plurality of vertical columns, and simultaneously installing preassembled bracings and girders to the plurality of vertical columns for configuring the lower and upper portions;
erecting the outer top grid along the upper portion of the hollow tower structure; and
uninstalling a selected preassembled bracings and girders from the lower portion of the hollow tower structure to configure the closable opening, from which the solar receiver steam generator is slid within the hollow tower structure.

9. The method of claim 1, wherein erecting the hollow tower structure comprises: erecting a concrete mixture vertically over and above the foundation base.

10. The method of claim 1, wherein the hollow tower structure includes a footprint area greater than the solar receiver steam generator to accommodate the solar receiver steam generator within the hollow tower structure footprint area.

11. The method of claim 1, wherein erecting the hollow tower structure further comprising erecting an auxiliary assembly in conjunction with the erection of the lifting system, the auxiliary assembly capable of being dismantled upon the lifting of the solar receiver steam generator along with the inner top grid, up to the upper portion of the hollow tower structure.

12. The method of claim 1, further comprising configuring at least one of a lift and a stair case to the hollow tower structure for transportation via the at least one lift and stair case.

13. The method of claim 1, further comprising dismantling the lifting system and the sliding arrangement.

14. A method for assembling a concentrated solar tower assembly for a solar power plant, the method comprising:
constructing a foundation base at a ground level;
installing a sliding arrangement of a first predetermined distance extending from the foundation base, and erecting an inner top grid capable of sliding on the sliding arrangement;
erecting a hollow tower structure extending vertically from the foundation base, the hollow tower structure defining a lower portion and an upper portion, the upper portion having a top grid obtained by coupling the inner top grid to an outer top grid, and the lower portion having a closable opening region;
erecting a solar receiver steam generator, at the ground level, on the inner top grid, slidable on the sliding arrangement at a second predetermined distance from the hollow tower structure, simultaneous to the hollow tower structure erection;
placing a lifting system on the outer top grid, the lifting system having at least one tension cable extending downwardly from the outer top grid;
configuring a closable opening along the closable opening region;
sliding the solar receiver steam generator along with the inner top grid on the sliding arrangement from the second predetermined distance to within the hollow tower structure from the closable opening of the lower portion;
closing the closable opening upon complete accommodation of the solar receiver steam generator within the lower portion of the hollow tower structure;

hoisting using the lifting system the solar receiver steam generator along with the inner top grid, from the lower portion to up to the upper portion within the hollow tower structure;

coupling the inner top grid having the solar receiver steam generator with the outer top grid for placing the solar receiver steam generator on a top gird of the upper portion; and dismantling the lifting system and the sliding arrangement.

* * * * *